(12) United States Patent
Song et al.

(10) Patent No.: US 8,114,311 B2
(45) Date of Patent: Feb. 14, 2012

(54) RED PHOSPHOR AND DISPLAY DEVICE INCLUDING THE SAME

(75) Inventors: Jay-Hyok Song, Suwon-si (KR); Ji-Hyun Kim, Suwon-si (KR); Ji-Hyun Kim, Suwon-si (KR); Hyun-Deok Lee, Suwon-si (KR); Seon-Young Kwon, Suwon-si (KR); Gyeong-Jae Heo, Suwon-si (KR); Do-Hyung Park, Suwon-si (KR); Yoon-Chang Kim, Suwon-si (KR); Yu-Mi Song, Suwon-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 433 days.

(21) Appl. No.: 12/320,552

(22) Filed: Jan. 29, 2009

(65) Prior Publication Data

US 2009/0195141 A1    Aug. 6, 2009

(30) Foreign Application Priority Data

Feb. 1, 2008    (KR) .................. 10-2008-0010677

(51) Int. Cl.
*C09K 11/78* (2006.01)
*C09K 11/81* (2006.01)
*C09K 11/82* (2006.01)
*C09K 11/80* (2006.01)

(52) U.S. Cl. .......... 252/301.4 R; 252/301.4 P; 313/486; 313/487

(58) Field of Classification Search ............ 252/301.4 R, 252/301.4 P; 313/486, 487
See application file for complete search history.

(56) References Cited

U.S. PATENT DOCUMENTS

| | | | | |
|---|---|---|---|---|
| 3,639,932 A | * | 2/1972 | Ferri et al. | 252/301.4 R |
| 3,711,418 A | * | 1/1973 | Mathers et al. | 252/301.4 R |
| 3,798,173 A | * | 3/1974 | Nath et al. | 252/301.4 F |
| 6,097,146 A | * | 8/2000 | Yoshimura | 313/486 |
| 7,232,530 B2 | * | 6/2007 | Kawamura et al. | 313/582 |
| 7,431,864 B2 | | 10/2008 | Hirosaki | |
| 7,436,108 B2 | | 10/2008 | Kim et al. | |
| 2002/0158234 A1 | * | 10/2002 | Suzuki | 252/500 |
| 2005/0146271 A1 | | 7/2005 | Aoki et al. | |
| 2006/0170325 A1 | | 8/2006 | Okishiro et al. | |
| 2007/0257231 A1 | | 11/2007 | Hirosaki | |

FOREIGN PATENT DOCUMENTS

| EP | 1 480 247 A1 | 11/2004 |
|---|---|---|
| EP | 1 840 183 A2 | 10/2007 |
| JP | 61-66785 | * 4/1986 |

(Continued)

OTHER PUBLICATIONS

European Office Action in EPP 101745, dated Feb. 14, 2011 (Song, et al.).

(Continued)

*Primary Examiner* — Carol M Koslow
(74) *Attorney, Agent, or Firm* — Lee & Morse, P.C.

(57) ABSTRACT

A red phosphor, including a first phosphor represented by Formula 1

$$(Y_{1-x1}M_{x1})_{2-y1}O_3{:}Eu_{y1} \qquad (1).$$

In Formula 1, M includes at least one of Gd, La, Sc, and Lu, and x1 and y1 satisfy the relations: $0.00 \leq x1 \leq 0.8$ and $0.025 \leq y1 \leq 0.20$.

19 Claims, 9 Drawing Sheets

Table 5: Decay time, CIE color coordinate, and Relative brightness.

| | Phosphor composition | Decay time (ms) | CIE color coordinate | | Relative birghtness (%) |
|---|---|---|---|---|---|
| | | | x | y | |
| Comparative Example 8 | $(Y_{0.75}Gd_{0.25})_{0.9}BO_3{:}Eu_{0.1}$ | 8.5 ± 0.2 | 0.666 | 0.328 | 100 |
| Example 18 | $(Y_{0.8}Gd_{0.2})_{1.9}O_3{:}Eu_{0.1}$ | 3.4 ± 0.2 | 0.668 | 0.327 | 92.8 |
| Example 19 | $((Y_{0.8}Gd_{0.2})_{1.9}O_3{:}Eu_{0.1}) : (Y_{0.9}(V_{0.4}P_{0.6})O_4{:}Eu_{0.1}) = 80:20$ weight ratio | 3.5 ± 0.2 | 0.670 | 0.326 | 87.3 |
| Example 20 | $((Y_{0.8}Gd_{0.2})_{1.9}O_3{:}Eu_{0.1}) : (Y_{0.75}Gd_{0.25})_{0.9}Al_3(BO_3)_4{:}Eu_{0.1}) = 8{:}2$ weight ratio | 3.5 ± 0.2 | 0.670 | 0.325 | 83.2 |

FOREIGN PATENT DOCUMENTS

| | | | |
|---|---|---|---|
| JP | 02-008291 A | | 1/1990 |
| JP | 10-195432 | | 7/1998 |
| JP | 11-73138 | * | 3/1999 |
| JP | 11-079742 | | 3/1999 |
| JP | 11-282414 | | 10/1999 |
| JP | 2003-45343 | * | 2/2003 |
| JP | 2003-303553 | | 10/2003 |
| JP | 2008-140617 A | | 6/2008 |
| KR | 10-2006-88401 | * | 8/2006 |
| KR | 10-2007-0046854 A | | 5/2007 |

OTHER PUBLICATIONS

Wang, L.S., et al., "Luminescence properties of $Y_{0.9-x}Gd_x Eu_{0.1}Al_3(BO_3)_4$ ($0 \leqq x \leqq 0.9$) phosphors prepared by spray pyrolysis process", Journal of Luminescence, 122-123, pp. 36-39, (2007).

Wu, Chia-Chin, et al., "Synthesis and VUV Photoluminescence Characterization of (Y,Gd)(V,P)O:Eu as a Potential Red-emitting PDP Phosphor", Chemistry of Materials. 19(13), pp. 3278-3285, (2007).

* cited by examiner

FIG. 5

Table 1: Decay time, CIE color coordinate, and Relative brightness $(Y_{1-x1}M_{x1})_{2-y1}O_3:Eu_{y1}$ (x1 = 0.00)

| | y1 | Decay time (ms) | CIE color coordinate | | Relative birghtness (%) |
|---|---|---|---|---|---|
| | | | x | y | |
| Comparative Example 1 | 0.010 | 3.8 ± 0.2 | 0.621 | 0.356 | 79.2 |
| Example 1 | 0.025 | 3.7 ± 0.2 | 0.635 | 0.354 | 87.0 |
| Example 2 | 0.050 | 3.7 ± 0.2 | 0.649 | 0.347 | 85.8 |
| Example 3 | 0.100 | 3.5 ± 0.2 | 0.658 | 0.340 | 80.8 |
| Example 4 | 0.200 | 3.4 ± 0.2 | 0.662 | 0.337 | 73.8 |
| Comparative Example 2 | 0.300 | 3.0 ± 0.2 | 0.662 | 0.336 | 50.4 |

FIG. 6

Table 2: Decay time, CIE color coordinate, and Relative brightness.

$(Y_{1-x1} Gd_{x1})_{2-y1} O_3 : Eu_{y1}$ (y1 = 0.10)

| | x1 | Decay time (ms) | CIE color coordinate | | Relative birghtness (%) |
|---|---|---|---|---|---|
| | | | x | y | |
| Example 5 | 0.0 | 3.5 ± 0.2 | 0.658 | 0.340 | 80.8 |
| Example 6 | 0.2 | 3.5 ± 0.2 | 0.659 | 0.340 | 82.4 |
| Example 7 | 0.4 | 3.4 ± 0.2 | 0.659 | 0.339 | 79.9 |
| Example 8 | 0.6 | 3.2 ± 0.2 | 0.660 | 0.339 | 77.3 |
| Example 9 | 0.8 | 3.0 ± 0.2 | 0.659 | 0.339 | 75.7 |
| Comparative Example 3 | 1.0 | 2.4 ± 0.2 | 0.675 | 0.323 | 24.9 |

FIG. 7

Table 3: Decay time, CIE color coordinate, and Relative brightness.

|  | Composition and mixing ratio (weight ratio) | | Decay time (ms) | CIE color coordinate | | Relative birghtness (%) |
|---|---|---|---|---|---|---|
|  | R1 | R2 |  | x | y |  |
| Example 10 | 100 | 0 | 3.5 ± 0.2 | 0.659 | 0.340 | 82.4 |
| Example 11 | 80 | 20 | 3.5 ± 0.2 | 0.660 | 0.339 | 77.4 |
| Example 12 | 60 | 40 | 3.6 ± 0.2 | 0.661 | 0.339 | 75.4 |
| Example 13 | 40 | 60 | 3.7 ± 0.2 | 0.663 | 0.338 | 73.5 |
| Comparative Example 4 | 20 | 80 | 3.8 ± 0.2 | 0.665 | 0.334 | 66.4 |
| Comparative Example 5 | 0 | 100 | 4.0 ± 0.2 | 0.667 | 0.332 | 62.1 |

FIG. 8

Table 4: Decay time, CIE color coordinate, and Relative brightness.

|  | Composition and mixing ratio (weight ratio) | | Decay time (ms) | CIE color coordinate | | Relative birghtness (%) |
| --- | --- | --- | --- | --- | --- | --- |
|  | R1 | R2 |  | x | y |  |
| Example 14 | 100 | 0 | 3.5 ± 0.2 | 0.659 | 0.340 | 82.4 |
| Example 15 | 80 | 20 | 3.5 ± 0.2 | 0.660 | 0.338 | 74.3 |
| Example 16 | 60 | 40 | 3.6 ± 0.2 | 0.661 | 0.335 | 70.1 |
| Example 17 | 40 | 60 | 3.6 ± 0.2 | 0.662 | 0.336 | 68.5 |
| Comparative Example 6 | 20 | 80 | 3.7 ± 0.2 | 0.663 | 0.335 | 55.9 |
| Comparative Example 7 | 0 | 100 | 3.8 ± 0.2 | 0.663 | 0.335 | 45.8 |

FIG. 9

Table 5: Decay time, CIE color coordinate, and Relative brightness.

| | Phosphor composition | Decay time (ms) | CIE color coordinate | | Relative birghtness (%) |
|---|---|---|---|---|---|
| | | | x | y | |
| Comparative Example 8 | $(Y_{0.75}Gd_{0.25})_{0.9}BO_3:Eu_{0.1}$ | 8.5 ± 0.2 | 0.666 | 0.328 | 100 |
| Example 18 | $(Y_{0.8}Gd_{0.2})_{1.9}O_3:Eu_{0.1}$ | 3.4 ± 0.2 | 0.668 | 0.327 | 92.8 |
| Example 19 | $((Y_{0.8}Gd_{0.2})_{1.9}O_3:Eu_{0.1}):(Y_{0.9}(V_{0.4}P_{0.6})O_4:Eu_{0.1})$ = 80 : 20 weight ratio | 3.5 ± 0.2 | 0.670 | 0.326 | 87.3 |
| Example 20 | $((Y_{0.8}Gd_{0.2})_{1.9}O_3:Eu_{0.1}):(Y_{0.75}Gd_{0.25})_{0.9}Al_3(BO_3)_4:Eu_{0.1})$ = 8:2 weight ratio | 3.5 ± 0.2 | 0.670 | 0.325 | 83.2 |

RED PHOSPHOR AND DISPLAY DEVICE INCLUDING THE SAME

BACKGROUND

1. Field

Embodiments relate to a red phosphor and a display device including the same.

2. Description of the Related Art

A stereoscopic image from a plasma display panel (PDP) may be realized by dividing 1 TV field (16.7 ms) into two subfields, respectively producing left and right stereoscopic images. Then, the PDP selectively emits the stereoscopic image to left and right eyes of a user wearing goggles. Optical shutters may be mounted on the left and right sides of the goggles to project the selected stereoscopic image signal to both eyes of the user by connecting the left subfield and the right subfield.

The phosphor layers in the PDP for a stereoscopic image should have a lower decay time than that of a general PDP, because the conventional 1 TV field is divided in half to provide two subfields. Particularly, phosphors having a decay time of more than 4.0 ms may cause a crosstalk phenomenon, e.g., acquiring a left subfield image by the right eye, thereby remarkably deteriorating the resolution and distinction of a stereoscopic image.

A decay time of 4.0 ms or less may be required for a three dimensional ("3D") PDP. Accordingly, a red phosphor having a short decay time may be required in order to realize a stereoscopic image.

SUMMARY

Embodiments are therefore directed to a red phosphor and a display device using the same, which substantially overcome one or more of the problems due to the limitations and disadvantages of the prior art.

It is therefore a feature of an embodiment to provide a red phosphor having a low decay time while maintaining brightness.

It is therefore another feature of an embodiment to provide a display device capable of displaying a three dimensional stereoscopic image.

At least one of the above and other features and advantages may be realized by providing a red phosphor, including a first phosphor represented by Formula 1

$$(Y_{1-x1}M_{x1})_{2-y1}O_3 : Eu_{y1} \qquad (1),$$

wherein, M includes at least one of Gd, La, Sc, and Lu, and x1 and y1 satisfy the relations: $0.00 \leq x1 \leq 0.8$ and $0.025 \leq y1 \leq 0.20$.

M may include Gd.

x1 and y1 may satisfy the relations: $0.00 \leq x1 \leq 0.4$ and $0.05 \leq y1 \leq 0.15$.

The red phosphor may further include an activator including at least one of Pr, Sm, Dy, and Tm.

The red phosphor may further include at least one second phosphor represented by at least one of Formulae 2 and 3

$$Y_{1-x2}(V_{y2}P_{1-y2})O_4 : Eu_{x2} \qquad (2),$$

wherein, x2 and y2 satisfy the relations $0.01 < x2 < 0.30$ and $0.30 < y2 < 0.60$, and $$(Y_{1-x3}M'_{x3})_{1-y3}Al_3(BO_3)_4 : Eu_{y3} \qquad (3),$$

wherein, M' includes at least one of Gd, La, Sc, and Lu, and x3 and y3 satisfy the relations $0.00 \leq x3 \leq 1.00$ and $0.01 < y3 < 0.30$.

x2 and y2 may satisfy the relations: $0.05 < x2 < 0.15$ and $0.35 < y2 < 0.45$.

The first and second phosphors may be included in a weight ratio of about 95:5 to about 40:60.

The first and second phosphors may be included in a weight ratio of about 95:5 to about 70:30.

The red phosphor may have a decay time of less than about 5 ms.

The red phosphor may have a decay time of about 3 to about 3.7 ms.

At least one of the above and other features and advantages may also be realized by providing a display device, including a red phosphor that includes a first phosphor represented by Formula 1

$$(Y_{1-x1}M_{x1})_{2-y1}O_3 : Eu_{y1} \qquad (1),$$

wherein, M includes at least one of Gd, La, Sc, and Lu, and x1 and y1 satisfy the relations: $0.00 \leq x1 \leq 0.8$ and $0.025 \leq y1 \leq 0.20$.

M may include Gd.

x1 and y1 may satisfy the relations: $0.00 \leq x1 \leq 0.4$ and $0.05 \leq y1 \leq 0.15$.

The red phosphor may further include an activator including at least one of Pr, Sm, Dy, and Tm.

The red phosphor may further include at least one second phosphor represented by at least one of Formulae 2 and 3

$$Y_{1-x2}(V_{y2}P_{1-y2})O_4 : Eu_{x2} \qquad (2),$$

wherein, x2 and y2 satisfy the relations: $0.01 < x2 < 0.30$ and $0.30 < y2 < 0.60$, and $$(Y_{1-x3}M'_{x3})_{1-y3}Al_3(BO_3)_4 : Eu_{y3} \qquad (3),$$

wherein, M' includes at least one of Gd, La, Sc, and Lu, and x3 and y3 satisfy the relations $0.00 \leq x3 \leq 1.00$ and $0.01 < y3 < 0.30$.

x2 and y2 may satisfy the relations $0.05 < x2 < 0.15$ and $0.35 < y2 < 0.45$.

The first and second phosphors may be included in a weight ratio of about 95:5 to about 40:60.

The first and second phosphors may be included in a weight ratio of about 95:5 to about 70:30.

The display device may realize three-dimensional stereoscopic images.

The red phosphor may have a decay time of less than about 5 ms.

The red phosphor may have a decay time of about 3 to about 3.7 ms.

BRIEF DESCRIPTION OF THE DRAWINGS

The above and other features and advantages will become more apparent to those of ordinary skill in the art by describing in detail exemplary embodiments thereof with reference to the attached drawings, in which:

FIG. 5 illustrates Table 1, showing color coordinates, brightness, and decay times for Examples 1-4 and Comparative Examples 1 and 2;

FIG. 6 illustrates Table 2, showing color coordinates, brightness, and decay times for Examples 5-9 and Comparative Example 3;

FIG. 7 illustrates Table 3, showing color coordinates, brightness, and decay times for Examples 10-13 and Comparative Examples 4 and 5;

FIG. 8 illustrates Table 4, showing color coordinates, brightness, and decay times for Examples 14-17 and Comparative Examples 6 and 7; and FIG. 9 illustrates Table 5, showing color coordinates, brightness, and decay times for Examples 18-20 and Comparative Example 8.

DETAILED DESCRIPTION

Figure 1:
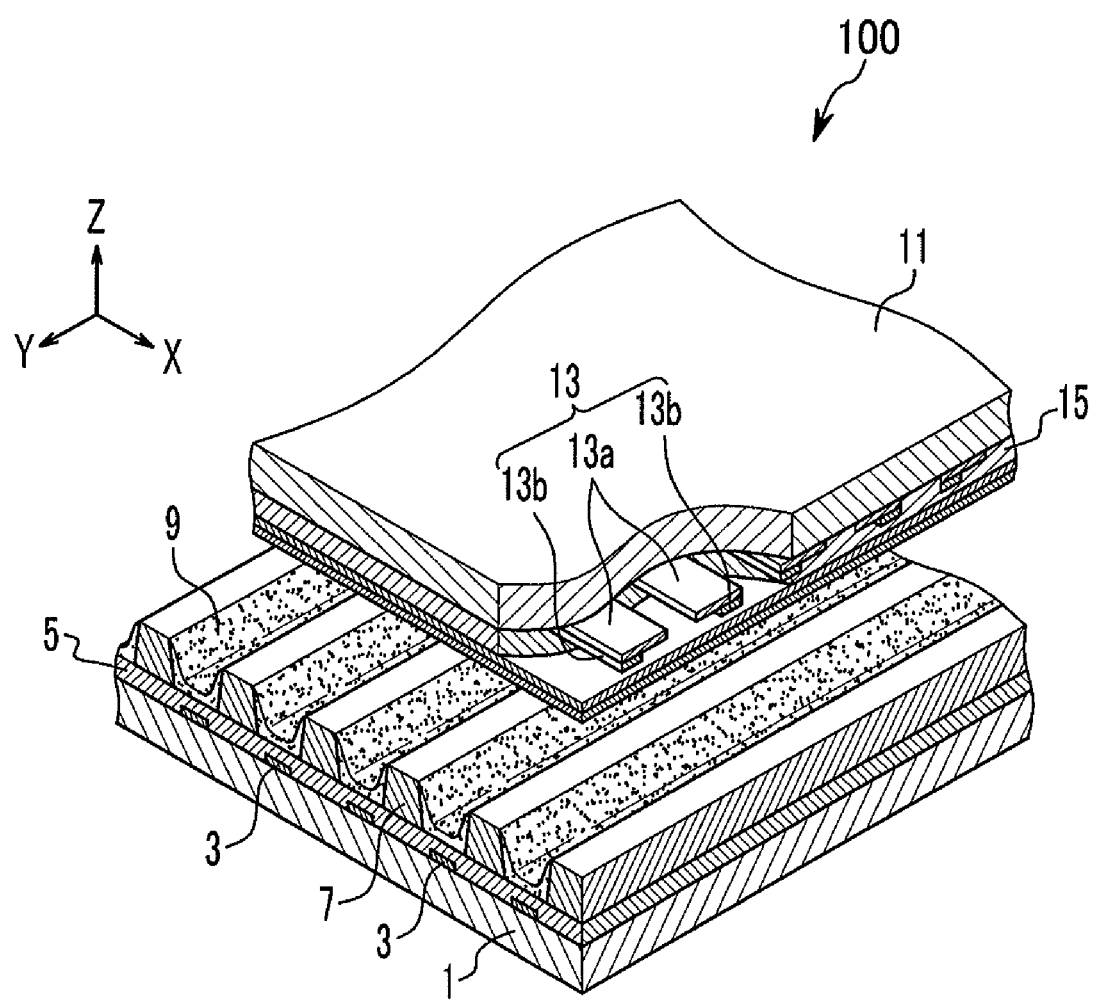
FIG. 1 illustrates a partial exploded perspective view of a PDP according to an embodiment.

Korean Patent Application No. 10-2008-0010677, filed on Feb. 1, 2008, in the Korean Intellectual Property Office, and entitled: "Red Phosphor for Display Device and Display Device Including the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

As used herein, the expressions "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" includes the following meanings: A alone; B alone; C alone; both A and B together; both A and C together; both B and C together; and all three of A, B, and C together. Further, these expressions are open-ended, unless expressly designated to the contrary by their combination with the term "consisting of." For example, the expression "at least one of A, B, and C" may also include an $n^{th}$ member, where n is greater than 3, whereas the expression "at least one selected from the group consisting of A, B, and C" does not.

As used herein, the expression "or" is not an "exclusive or" unless it is used in conjunction with the term "either." For example, the expression "A, B, or C" includes A alone; B alone; C alone; both A and B together; both A and C together; both B and C together; and all three of A, B and, C together, whereas the expression "either A, B, or C" means one of A alone, B alone, and C alone, and does not mean any of both A and B together; both A and C together; both B and C together; and all three of A, B and C together.

As used herein, the terms "a" and "an" are open terms that may be used in conjunction with singular items or with plural items. For example, the term "an activator" may represent a single compound, e.g., dysprosium, or multiple compounds in combination, e.g., dysprosium mixed with samarium.

As used herein, the term "decay time" means the time for decreasing optical volume expressed from a phosphor to $\frac{1}{10}$ of the initial optical volume.

Embodiments relate a red phosphor having a short decay time that may be used in a display device, particularly a display device for displaying a three-dimensional ("3D") stereoscopic image. The display device may include, e.g., a plasma display panel (PDP), a cathode ray tube (CRT), and the like, able to realize a 3D stereoscopic image. According to another embodiment, the red phosphor may be used in a PDP having an excitation source of vacuum ultraviolet (VUV) rays.

The red phosphor may include a first phosphor represented by Formula 1:

$$(Y_{1-x1}M_{x1})_{2-y1}O_3:Eu_{y1} \qquad (1).$$

In Formula 1, M may include at least one of Gd, La, Sc, and Lu. Preferably, M includes Gd. x1 and y1 may satisfy the relations: $0.00 \leq x1 \leq 0.8$ and $0.025 \leq y1 \leq 0.20$. Preferably, x1 and y1 satisfy the relations: $0.00 \leq x1 \leq 0.4$ and $0.05 \leq y1 \leq 0.15$.

The red phosphor of an embodiment may include at least one of Pr, Sm, Dy, and Tm, as an activator. The activator may be included in the phosphor in a molar ratio of about 0.025 to about 0.20.

According to an embodiment, a red phosphor may include a first phosphor represented by Formula 1 and a second phosphor represented by at least one of Formulae 2 and 3. The second phosphor may also include any suitable red phosphor that maintains luminescence characteristics and improves the red color coordinate characteristic.

$$Y_{1-x2}(V_{y2}P_{1-y2})O_4:Eu_{x2} \qquad (2)$$

In Formula 2, x2, and y2 may satisfy the relations: $0.01 < x2 < 0.30$ and $0.30 < y2 < 0.60$. Preferably, x2 and y2 satisfy the relations: $0.05 \leq x2 \leq 0.15$ and $0.35 \leq y2 \leq 0.45$.

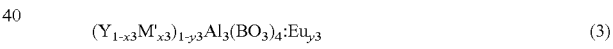

$$(Y_{1-x3}M'_{x3})_{1-y3}Al_3(BO_3)_4:Eu_{y3} \qquad (3)$$

In Formula 3, M' may include at least one of Gd, La, Sc, and Lu, and x3 and y3 may satisfy the relations: $0.00 \leq x3 \leq 1.00$ and $0.01 < y3 < 0.30$. Preferably, x3 and y3 satisfy the relations: $0.20 \leq x3 \leq 1.00$, and $0.05 \leq y3 \leq 0.15$.

According to an embodiment, the first and second phosphors may be included in a weight ratio of about 95:5 to about 40:60. Preferably, the first and the second phosphors are included in a weight ratio or about 95:5 to about 70:30. Providing the first and second phosphors within these amounts may help ensure that the red color coordinate characteristics are improved while maintaining brightness, thereby improving the color quality.

The red phosphor according to an embodiment may have a short decay time and excellent color coordinate characteristics without a decrease in brightness, so that it may be used in a display device. Particularly, the red phosphor may be used in a display device that is capable of being driven at a high speed of, e.g., about 120 Hz, about 160 Hz, or higher. The red phosphor may also be used in a device for displaying 3D stereoscopic images. The red phosphor may have a decay time of about 5 ms or less. Preferably, the red phosphor has a decay time of about 4.0 ms or less, and more preferably, about 3.0 to about 3.7 ms.

Another embodiment may provide a display device including the red phosphor. Hereinafter, a PDP is to be described as an example.

FIG. 1 illustrates a partial exploded perspective view of a PDP 100 according to an embodiment.

As shown in FIG. 1, the PDP may include a first substrate 1 (a rear substrate) and a second substrate 11 (a front substrate), that are disposed substantially parallel with each other with a predetermined distance therebetween.

On the surface of the first substrate 1, a plurality of address electrodes 3 may be disposed in one direction (the Y direction in the drawing), and a first dielectric layer 5 may be disposed covering the address electrodes 3. Next, a plurality of barrier ribs 7 may be formed with a predetermined height on the first dielectric layer 5 and between the address electrodes 3 to form discharge spaces.

The barrier ribs 7 may be formed in any suitable shape, as long as the barrier ribs 7 partition the discharge spaces. In addition, the barrier ribs 7 may have diverse patterns. For example, the barrier ribs 7 may be formed as open types, e.g., stripes, or as closed types, e.g., waffles, matrixes, or delta shapes. Also, the closed type of barrier ribs may be formed such that each discharge space has a horizontal cross-section of a polygon, e.g., a quadrangle, a triangle, or a pentagon, or a circle or an oval.

Then, red (R), green (G), and blue (B) phosphor layers 9 may be disposed in discharge cells formed between the barrier ribs 7. The red (R) phosphor layer may include the red phosphor of an embodiment.

Display electrodes 13, each including transparent electrodes 13a and bus electrodes 13b, may be disposed in a direction crossing the address electrodes 3 (an X direction in the drawing) on one surface of the second substrate 11 facing the first substrate 1. Also, a dielectric layer 15 may be disposed on the surface of the second substrate 11 and covering the display electrodes 13.

The discharge cells may be formed where the address electrodes 3 on the first substrate 1 cross the display electrodes 13 on the second substrate 11. The discharge cells may be filled with a discharge gas.

With the above-described structure, address discharge may be achieved by applying an address voltage (Va) to a space between the address electrodes 3 and any one display electrode 13. When a sustain voltage (Vs) is applied to a space between a pair of discharge sustain electrodes 13, an excitation source generated from the sustain discharge may excite a corresponding phosphor layer 9, which emits visible light through the transparent second substrate 11 and realizes an image. The excitation source may include VUV rays.

The following Examples may illustrate embodiments in more detail. The following examples of the embodiments are not more than specific examples, and the scope is not limited by the examples.

Examples 1 to 4 and Comparative Examples 1 to 2

$Y_2O_3$ and $Eu_2O_3$ were mixed according to a stoichiometric ratio to have the compositions shown in Table 1 of FIG. 5. 0.5 wt % of $NH_4Cl$ was then added as a flux. 100 g of the obtained mixture was introduced into a 300 cc alumina crucible and fired at 1500° C. for 0.5 hours under an oxygen atmosphere. The resulting mixture was pulverized with a ball mill for 5 hours, washed, dried, and sieved to prepare a phosphor.

The phosphors obtained from Examples 1 to 4 and Comparative Examples 1 and 2 were measured for their color coordinate (CIE x, y), decay time, and relative brightness. The results are shown in Table 1. The CIE color coordinates for a red phosphor were evaluated and then compared with reference values. An ideal value for x is about 0.67 and an ideal value for y is about 0.33. The relative brightness was determined as a relative value to that of a $(Y_{0.75}Gd_{0.25})_{0.9}BO_3:Eu_{0.1}$ phosphor. The relative brightness of the $(Y_{0.75}Gd_{0.25})_{0.9}BO_3:Eu_{0.1}$ phosphor was considered to be 100%. The $(Y_{0.75}Gd_{0.25})_{0.9}BO_3:Eu_{0.1}$ phosphor was prepared as follows. First, $Y_2O_3$, $Gd_2O_5$, and $Eu_2O_3$ were mixed according to a stoichiometric ratio. Then $B_2O_3$ was added as a flux in an amount of 110 wt %. 100 g of the obtained mixture was introduced into a 300 cc alumina crucible and fired at 1200° C. for 2 hours under an oxygen atmosphere. The fired mixture was pulverized by using a ball mill for 5 hours, washed, dried, and sieved to provide a phosphor.

The "±0.2" in Table 1 represents a measurement error in the decay time.

Eu may be present in the phosphor in a molar ratio of about 0.025 to about 0.20. As shown in Table 1, maintaining the molar ratio of Eu in the phosphor at about 0.025 or greater may help ensure that the red phosphor has an ideal color coordinate characteristic. Maintaining the molar ratio at about 0.2 or less may help ensure that the red phosphor does not have decreased luminescence characteristics.

Examples 5 to 9 and Comparative Example 3

A red phosphor was prepared according to the same method as in Example 1, except that $Y_2O_3$, $Gd_2O_3$, and $Eu_2O_3$ were mixed according to a stoichiometric ratio to have the compositions shown in Table 2 of FIG. 6.

The phosphors obtained according to Examples 5 to 9 and Comparative Example 3 were measured for their color coordinate (CIE x, y), decay time, and relative brightness. The results are shown in Table 2. The relative brightness was determined as a relative value to that of the $(Y_{0.75}Gd_{0.25})_{0.9}BO_3:Eu_{0.1}$ phosphor. The relative brightness of $(Y_{0.75}Gd_{0.25})_{0.9}BO_3:Eu_{0.1}$ was considered to be 100%. The "±0.2" in Table 2 represents a measurement error in the decay time.

As shown in Table 2, as the molar ratio of Gd in the phosphor increased, the decay time gradually decreased, but the brightness also decreased. Accordingly, maintaining the Gd in a molar ratio of less than about 0.8 may help ensure satisfactory decay time and brightness.

The $(Y_{0.8}Gd_{0.2})_{1.9}O_3:Eu_{0.1}$ phosphor according to Example 6 was measured for its fluorescent spectrum. The result is shown in FIG. 2.

Figure 2:
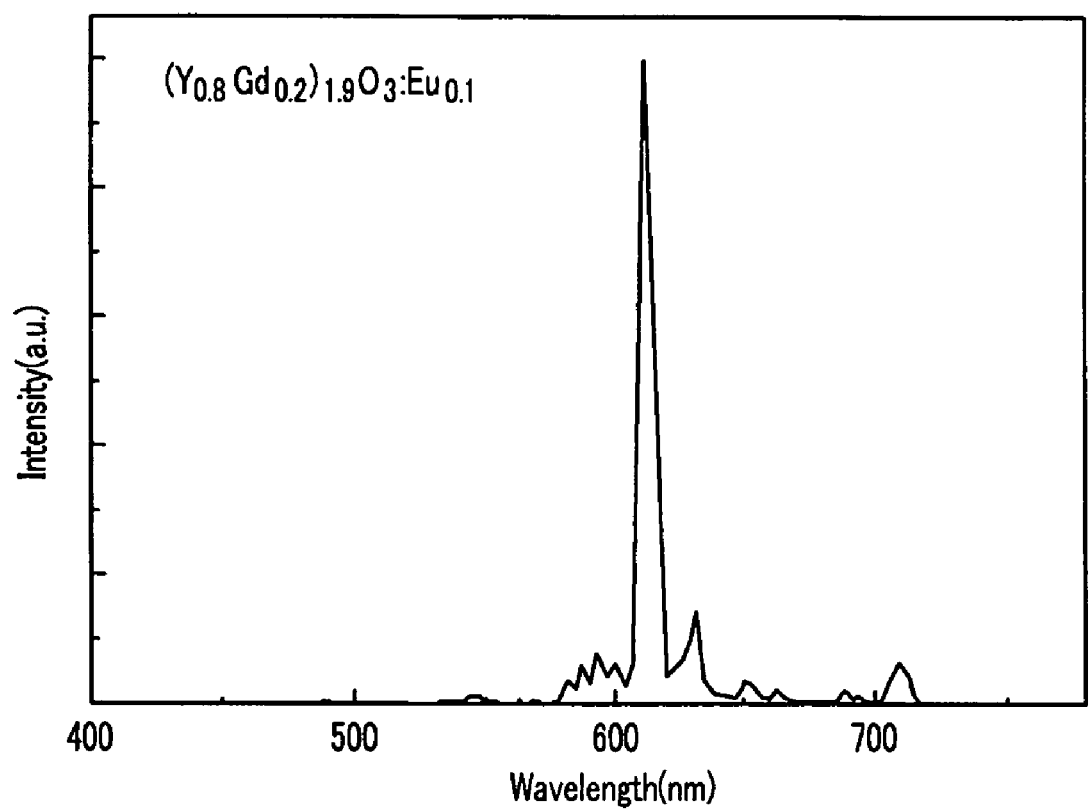
FIG. 2 illustrates a graph of a fluorescent spectrum of the $(Y_{0.8}Gd_{0.2})_{1.9}O_3 : Eu_{0.1}$ phosphor according to Example 6.

As shown in FIG. 2, the $(Y_{0.8}Gd_{0.2})_{1.9}O_3:Eu_{0.1}$ phosphor's intensity decreased at around 590 nm and was highest at about 610 to about 650 nm. Accordingly, it may be used in a PDP including a Ne-cut filter (light-cut at about 590 nm), to improve color purity.

Examples 10 to 13 and Comparative Examples 4 to 5

A red phosphor was prepared by mixing a $(Y_{0.8}Gd_{0.2})_{1.9}O_3:Eu_{0.1}$ as a first phosphor R1 with $Y_{0.9}(V_{0.4}P_{0.6})O_4:Eu_{0.1}$ as a second phosphor R2, to have the compositions shown in Table 3 of FIG. 7.

The $Y_{0.9}(V_{0.4}P_{0.6})O_4:Eu_{0.1}$ as a second phosphor R2 was prepared as follows. First, $Y_2O_3$, $V_2O_5$, $Eu_2O_3$, and diammonium phosphate $(NH_4)_2HPO_4$ were mixed according to a stoichiometric ratio. Then, 3.0 wt % of $H_3BO_3$ was added as a flux. 100 g of the obtained mixture was introduced into a 300 cc alumina crucible and fired at 1200° C. for 2 hours under an oxygen atmosphere. The fired mixture was pulverized by using a ball mill for 5 hours, washed, dried, and sieved to provide a phosphor.

The phosphors obtained according to Examples 10 to 13 and Comparative Examples 4 and 5 were measured for their color coordinate (CIE x, y), decay time, and relative brightness. The results are shown in Table 3. The relative brightness was determined as a relative value to that of the $(Y_{0.75}Gd_{0.25})_{0.9}BO_3:Eu_{0.1}$ phosphor. The relative brightness of the $(Y_{0.75}Gd_{0.25})_{0.9}BO_3:Eu_{0.1}$ phosphor was considered to be 100%. The "±0.2" in Table 3 represents a measurement error in the decay time.

As shown in Table 3, the phosphor of Example 10 including only the first phosphor had a deteriorated color coordinate characteristic and longer decay time, but exhibited excellent relative brightness and excellent luminescence characteristics. The phosphor of Example 13, including the first and second phosphors at a weight ratio of about 40:60, exhibited lower brightness but exhibited a good red coordinate, as CIE x increased and CIE y decreased, compared with the brightness and color coordinate of Example 10. The phosphors of Examples 10 to 13 all exhibited suitable relative brightness and decay characteristics. The phosphor of Comparative Example 4 including greater amounts of the second phosphor, and the phosphor of Comparative Example 5 including only the second phosphor, had excellent color coordinate characteristics, but long decay times and deteriorated relative brightness.

Examples 14 to 17 and Comparative Examples 6 to 7

Red phosphors were prepared by mixing $(Y_{0.8}Gd_{0.2})_{1.9}O_3:Eu_{0.1}$ as a first phosphor R1 with $(Y_{0.75}Gd_{0.25})_{0.9}Al_3(BO_3)_4:Eu_{0.1}$ as a second phosphor R2, according to the compositions shown in Table 4 of FIG. 8. The second phosphor R2 of $(Y_{0.75}Gd_{0.25})_{0.9}Al_3(BO_3)_4:Eu_{0.1}$ was prepared as follows. First, $Y_2O_3$, $Gd_2O_3$, $Eu_2O_3$, and $Al_2O_3$ were mixed according to a stoichiometric ratio. Then, $B_2O_3$ was added as a flux in an amount of 110 wt %. 100 g of the obtained mixture was introduced into a 300 cc alumina crucible and fired at 1150° C. for 2 hours under an oxygen atmosphere. The fired mixture was pulverized by using a ball mill for 5 hours, washed, dried, and sieved to provide a phosphor.

Figure 3:
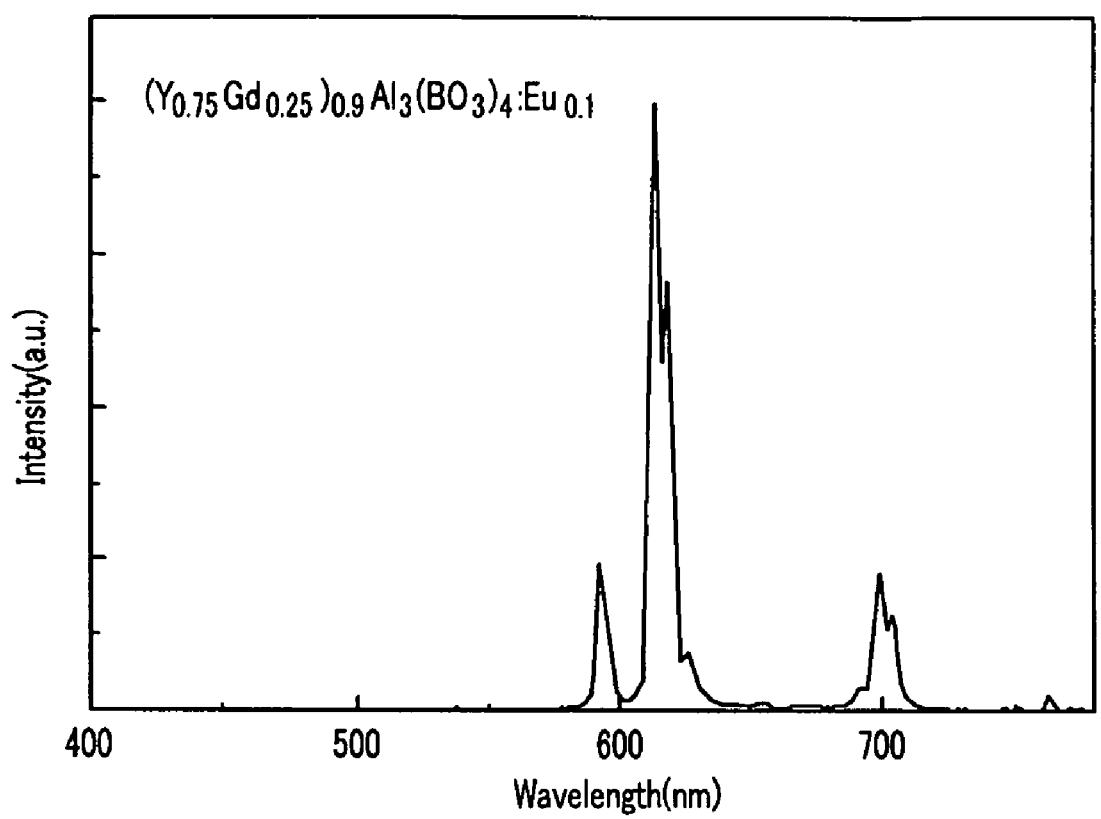
FIG. 3 illustrates a graph of a fluorescent spectrum of a $(Y_{0.75}Gd_{0.25})_{0.9}Al_3(BO_3)_4 : Eu_{0.1}$ phosphor according to Example 14.

The $(Y_{0.75}Gd_{0.25})_{0.9}Al_3(BO_3)_4:Eu_{0.1}$ as a second phosphor R2 was measured for its fluorescent spectrum. The result is shown in FIG. 3. As shown in FIG. 3, since the $(Y_{0.75}Gd_{0.25})_{0.9}Al_3(BO_3)_4:Eu_{0.1}$ phosphor weakly emitted light around 590 nm and mostly emitted light at about 610 to about 650 nm, it may be used in a PDP including an Ne-cut filter (light-cut around 590 nm), to improve color purity.

The phosphors obtained according to Examples 14 to 17 and Comparative Examples 6 and 7 were measured for their color coordinate (CIE x, y), decay time, and relative brightness. The results are shown in Table 4. The relative brightness was determined as a relative value to that of the $(Y_{0.75}Gd_{0.25})_{0.9}BO_3:Eu_{0.1}$ phosphor. The relative brightness of the $(Y_{0.75}Gd_{0.25})_{0.9}BO_3:Eu_{0.1}$ phosphor was considered to be 100%. The "±0.2" in Table 4 represents a measurement error in the decay time.

As shown in Table 4, the phosphor according to Example 14 including only the first phosphor and the phosphors of Examples 15 to 17 including the first and second phosphor in a weight ratio of about 40:60 to about 80:20 were found to have satisfactory decay times, relative brightness, and color coordinates.

The phosphor according to Comparative Example 6 including greater amounts of the second phosphor, and that of Comparative Example 7 including only the second phosphor, had excellent decay times and color coordinate characteristics, but exhibited deteriorated relative brightness.

Examples 18 to 20 and Comparative Example 8

Red phosphors were prepared according to the compositions shown in Table 5 of FIG. 9. The red phosphors were used to fabricate a PDP including a conventional Ne-cut filter. A $(Y_{0.75}Gd_{0.25})_{0.9}BO_3:Eu_{0.1}$ phosphor according to Comparative Example 8, was also included in a PDP. The PDPs according to Examples 18 to 20 and Comparative Example 8 were measured for their decay time, color coordinate, and relative brightness. The results are shown in Table 5.

The relative brightness was determined as a relative value to that of the phosphor according to Comparative Example 8, considering its relative brightness to be 100%. The "±0.2" in Table 5 represents a measurement error in the decay time.

As shown in Table 5, the PDPs according to Examples 18 to 20 had a slightly deteriorated relative brightness with short decay times and good color coordinate characteristics, compared with the PDP according to Comparative Example 8. When the PDPs of Examples 18 to 20 included a Ne-cut filter, they exhibited a decay time necessary to realize a 3D stereoscopic image.

Figure 4:
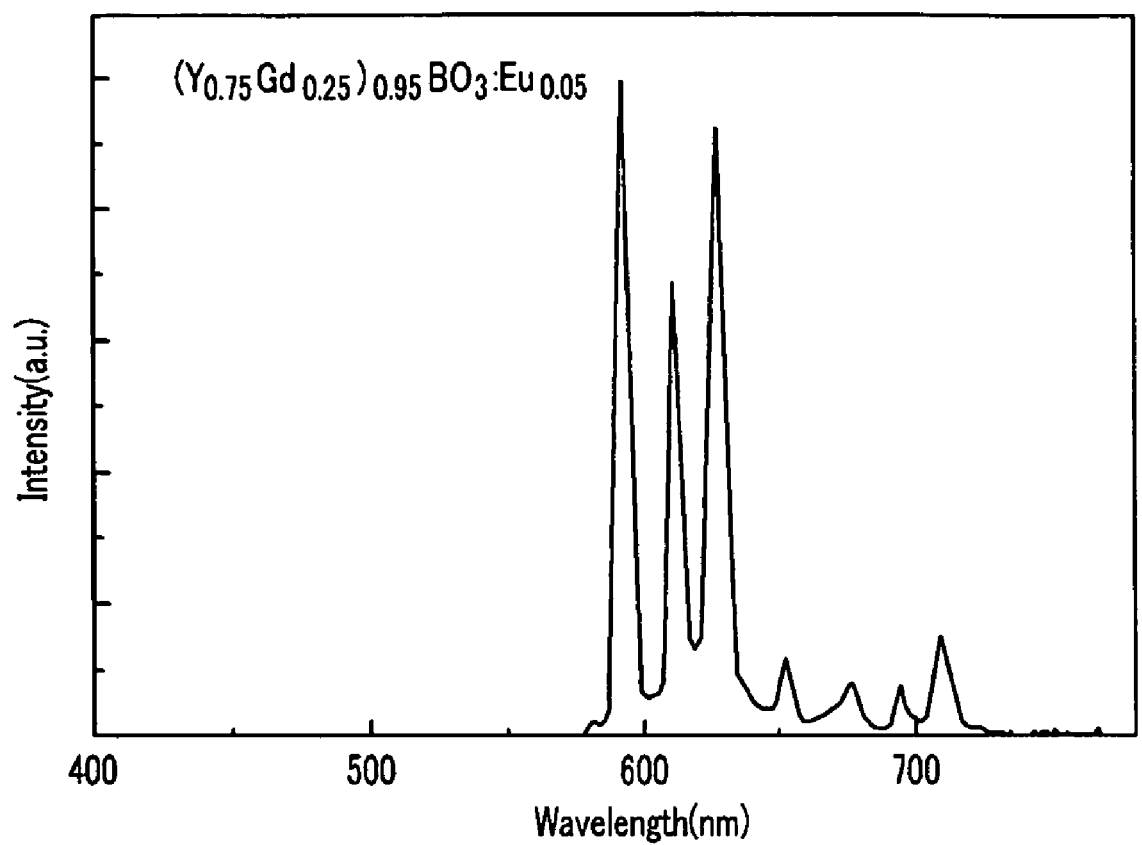
FIG. 4 illustrates a graph illustrating a fluorescent spectrum of a $(Y_{0.75}Gd_{0.25})_{0.9}BO_3 : Eu_{0.1}$ phosphor according to Comparative Example 8.

The $(Y_{0.75}Gd_{0.25})_{0.9}BO_3:Eu_{0.1}$ phosphor according to Comparative Example 8 was measured for its fluorescent spectrum. The result is shown in FIG. 4. As shown in FIG. 4, the $(Y_{0.75}Gd_{0.25})_{0.0}BO_3:Eu_{0.1}$ phosphor had the highest intensity at around 593 nm. When it was used in a PDP including an Ne-cut filter, which filters light of about 590 nm, almost all light was filtered and brightness was deteriorated.

Since the phosphors according to the embodiments emitted little light at around 590 nm, as shown in FIG. 2, showing the fluorescent spectrum of Example 6, they did not exhibit much deteriorated brightness, despite the presence of a Ne-cut filter. As a result, the PDPs including phosphors according to Examples 6 and 18 had higher relative brightness than a commercially-available PDP including a Ne-cut filter. This may be observed in the relative brightness of Tables 2 and 5.

A red phosphor having a short decay time and good brightness may be useful for the next generation virtual 3D stereoscopic multimedia, which may be applied to fields of, e.g., telecommunications, broadcasting, medical, education, training, military, games, animation, virtual reality, CAD, industrial technology, and so on.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:
1. A red phosphor, comprising:
a first phosphor represented by Formula 1

$$(Y_{1-x1}M_{x1})_{2-y1}O_3:Eu_{y1};\tag{1}$$

at least one second phosphor represented by at least one of Formulae 2 and 3

$$Y_{1-x2}(V_{y2}P_{1-y2})O_4:Eu_{x2}\tag{2}$$

$$(Y_{1-x3}M'_{x3})_{1-y3}Al_3(BO_3)_4:Eu_{y3}\tag{3}$$

wherein, M includes at least one of Gd, La, Sc, and Lu, and x1 and y1 satisfy the relations: $0.00 \leq x1 \leq 0.8$ and $0.025 \leq y1 \leq 0.20$,
x2 and y2 satisfy the relations $0.01 < x2 < 0.30$ and $0.30 < y2 < 0.60$,
M' includes at least one of Gd, La, Sc, and Lu, and x3 and y3 satisfy the relations: $0.00 \leq x3 \leq 1.00$ and $0.01 < y3 < 0.30$, and
at least one of the first phosphor and the second phosphor includes at least one of Gd, La, Sc, and Lu.

2. The red phosphor as claimed in claim 1, wherein M includes Gd.

3. The red phosphor as claimed in claim 1, wherein x1 and y1 satisfy the relations: $0.00 \leq x1 \leq 0.4$ and $0.05 \leq y1 \leq 0.15$.

4. The red phosphor as claimed in claim 1, further comprising an activator including at least one of Pr, Sm, Dy, and Tm.

5. The red phosphor as claimed in claim 1, wherein x2 and y2 satisfy the relations: $0.05 < x2 < 0.15$ and $0.35 < y2 < 0.45$.

6. The red phosphor as claimed in claim 1, wherein the first and second phosphors are included in a weight ratio of about 95:5 to about 40:60.

7. The red phosphor as claimed in claim 6, wherein the first and second phosphors are included in a weight ratio of about 95:5 to about 70:30.

8. The red phosphor as claimed in claim 1, wherein the red phosphor has a decay time of less than about 5 ms.

9. The red phosphor as claimed in claim 8, wherein the red phosphor has a decay time of about 3 to about 3.7 ms.

10. A display device, comprising:

a red phosphor including a first phosphor represented by Formula 1

$$(Y_{1-x1}M_{x1})_{2-y1}O_3:Eu_{y1} \quad (1),$$

at least one second phosphor represented by at least one of Formulae 2 and 3

$$Y_{1-x2}(V_{y2}P_{1-y2})O_4:Eu_{x2} \quad (2),$$

$$(Y_{1-x3}M'_{x3})_{1-y3}Al_3(BO_3)_4:Eu_{y3} \quad (3),$$

wherein, M includes at least one of Gd, La, Sc, and Lu, and x1 and y1 satisfy the relations: $0.00 \leq x1 \leq 0.8$ and $0.025 \leq y1 \leq 0.20$, x2 and y2 satisfy the relations $0.01 < x2 < 0.30$ and $0.30 < y2 < 0.60$, M' includes at least one of Gd, La, Sc, and Lu, and x3 and y3 satisfy the relations: $0.00 \leq x3 \leq 1.00$ and $0.01 < y3 < 0.30$, and at least one of the first phosphor and the second phosphor includes at least one of Gd, La, Sc, and Lu.

11. The display device as claimed in claim 10, wherein M includes Gd.

12. The display device as claimed in claim 10, wherein x1 and y1 satisfy the relations: $0.00 \leq x1 \leq 0.4$ and $0.05 \leq y1 \leq 0.15$.

13. The display device as claimed in claim 10, wherein the red phosphor further comprises an activator including at least one of Pr, Sm, Dy, and Tm.

14. The display device as claimed in claim 10, wherein x2 and y2 satisfy the relations $0.05 < x2 < 0.15$ and $0.35 < y2 < 0.45$.

15. The display device as claimed in claim 10, wherein the first and second phosphors are included in a weight ratio of about 95:5 to about 40:60.

16. The display device as claimed in claim 15, wherein the first and second phosphors are included in a weight ratio of about 95:5 to about 70:30.

17. The display device as claimed in claim 10, wherein the display device realizes three-dimensional stereoscopic images.

18. The display device as claimed in claim 10, wherein the red phosphor has a decay time of less than about 5 ms.

19. The display device as claimed in claim 18, wherein the red phosphor has a decay time of about 3 to about 3.7 ms.

* * * * *